Nov. 16, 1937.　　　　E. W. BACKES　　　　2,098,938
TRACK GAUGE INDICATOR
Filed April 16, 1937　　　2 Sheets-Sheet 1
Fig. 1.
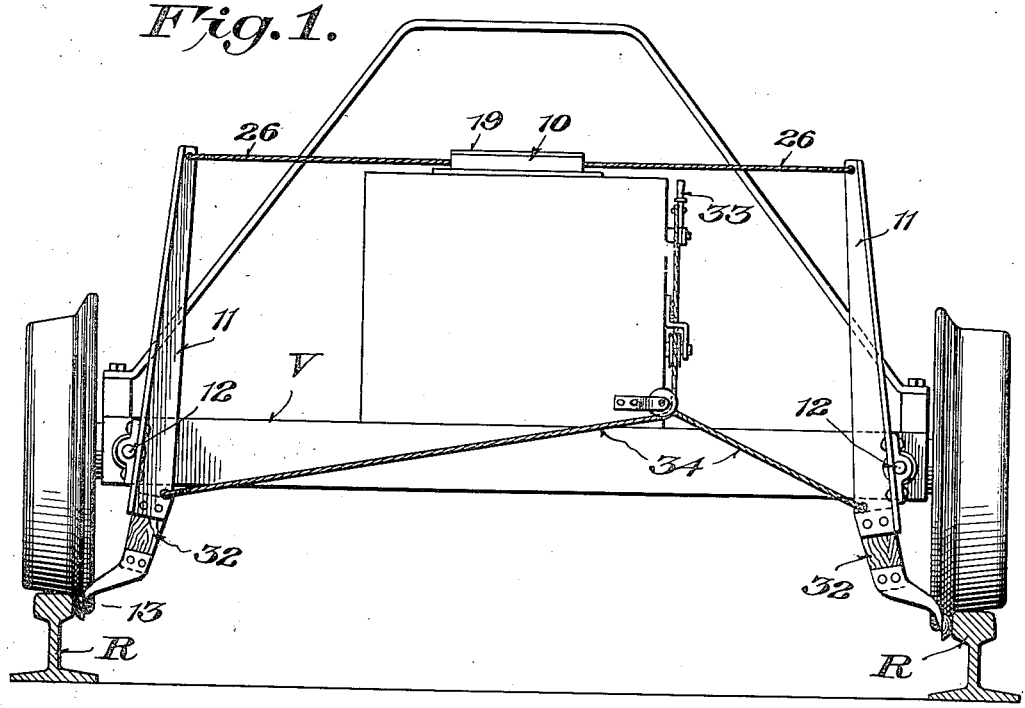
Fig. 2.
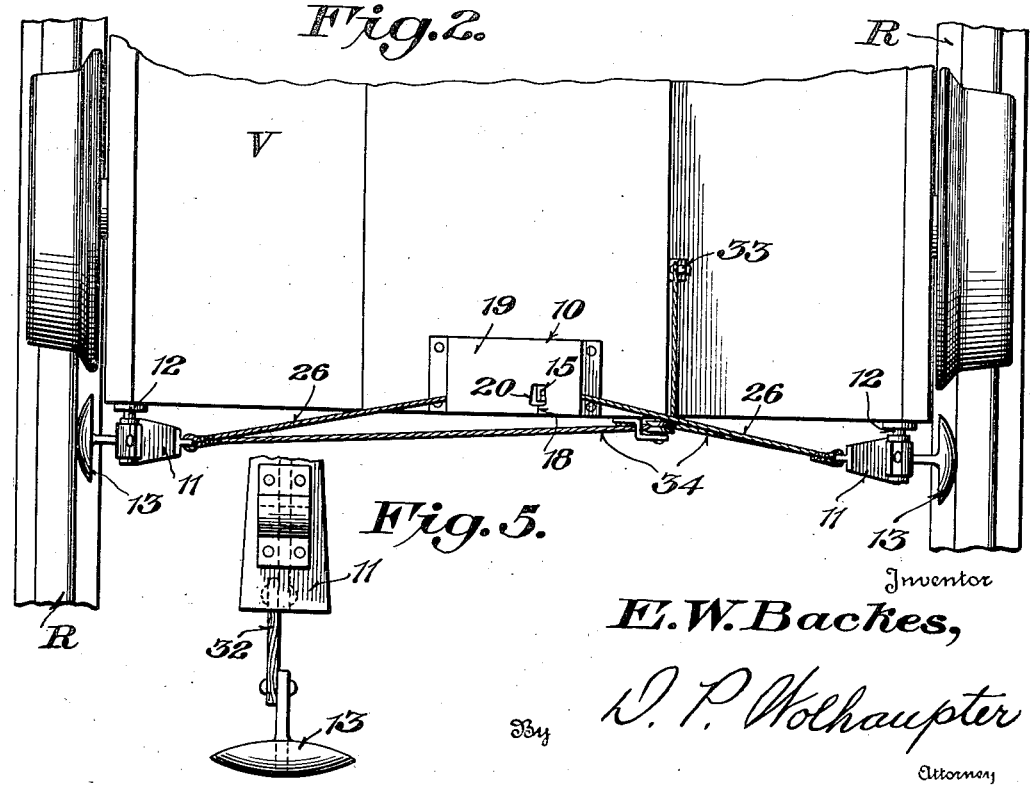
Fig. 5.
Inventor
E. W. Backes,
D. P. Wolhaupter
By
Attorney

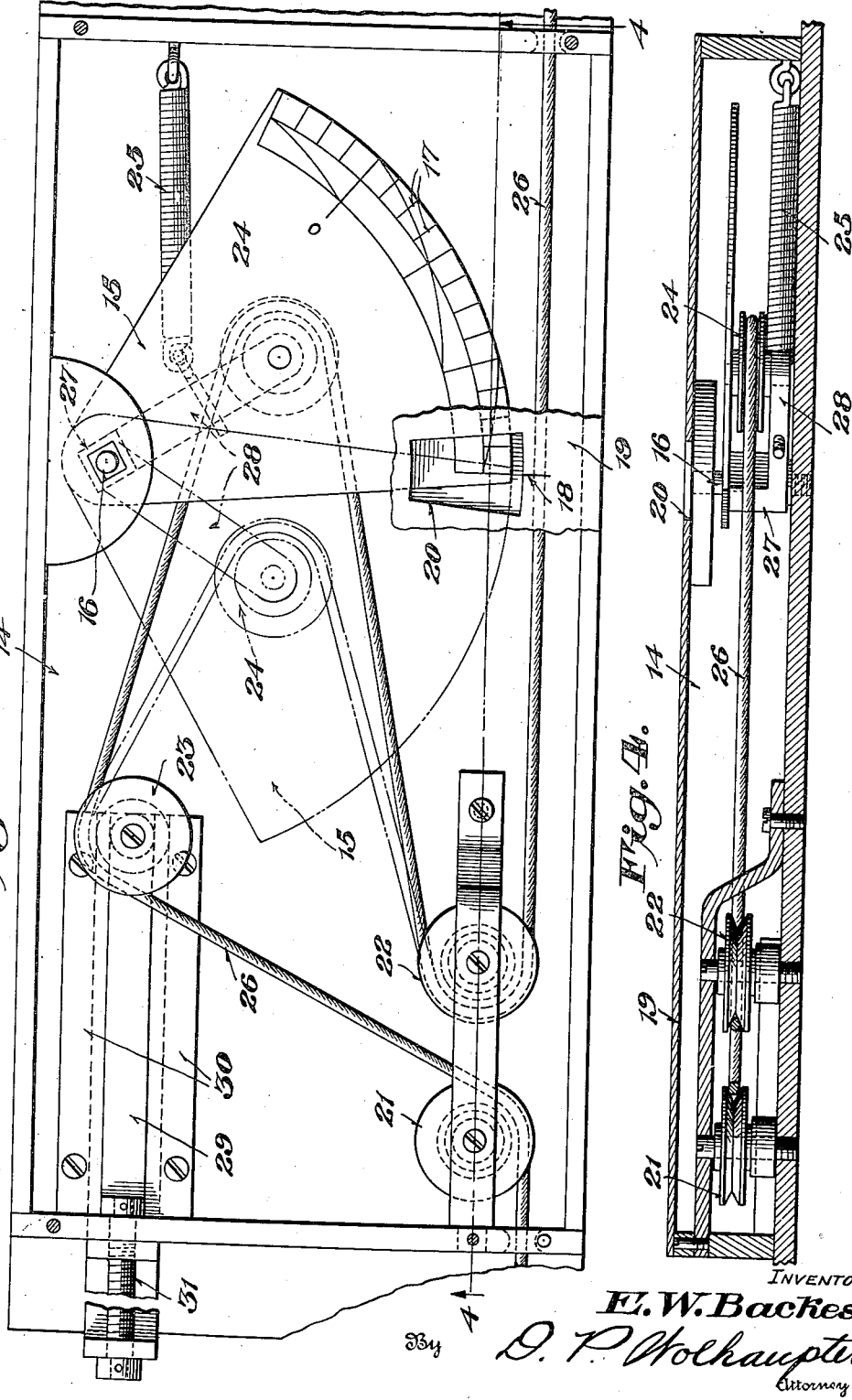

Patented Nov. 16, 1937

2,098,938

UNITED STATES PATENT OFFICE 2,098,938

TRACK GAUGE INDICATOR

Edward William Backes, Cook County, Ill., assignor to Poor & Company, New York, N. Y., a corporation of Delaware Application April 16, 1937, Serial No. 137,363

4 Claims. (Cl. 33—146)

This invention relates to railway track gauge indicators, and has generally in view to provide a simple, inexpensive track gauge indicating mechanism which may readily be mounted upon a handcar, railway motorcycle or other track traveling vehicle for movement along a track, and which is effective, when moved along a track, to indicate whether the rails are properly spaced apart, or are improperly spaced too far apart or too closely together by a definite amount at any particular point.

According to the invention, a movable indicating element and a pair of intermediately pivoted levers, one related to each rail, are provided. Corresponding ends of the levers are connected with the movable indicating element and at the other ends of said levers are tips for contact with the inner or gauge faces of the rails, suitable spring means being provided to tend constantly to swing said levers to urge their tipped ends outwardly into engagement with the gauge faces of the rails. Thus, as the mechanism is moved along a track, any variation in the true gauge of the rails results in swinging movement of the levers and actuation of the movable indicating element relative to a fixed index, movable tape or the like to indicate the incorrectness of the gauge and the amount of the incorrectness. In this connection, since the tipped ends of the levers constantly are urged outwardly, it is manifest that when passing through frogs, switches and the like, there would exist the possibility of the said tipped ends encountering obstructions, with the consequent possibility of serious damage to the mechanism, unless means are provided to restrain outward movement of the said tipped ends. Accordingly, a special object of the invention is to provide means which may be operated manually to restrain outward movement of the tipped ends of said levers whenever desired, as, for example, when the mechanism is about to pass through a frog, switch or the like, to insure against damage to the mechanism which might otherwise result because of one or the other of the tipped ends encountering an obstruction in the switch frog or the like. Another special object of the invention in this connection is to provide the levers with readily shatterable portions which may readily and inexpensively be replaced so that, should the tipped end of either of the levers encounter an obstruction during the normal functioning of the mechanism, the shatterable portion of the lever will break with consequent avoidance of damage to the remainder of the mechanism and consequent avoidance of material repair costs.

Another object of the invention is to provide a simple indicating means operable by the levers, and to provide a complete mechanism which is thoroughly reliable and accurate in operation.

With the foregoing and other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 1 is an end elevation of a track traveling vehicle showing the present track gauge indicating mechanism operatively mounted thereon.

Figure 2 is a fragmentary top plan view of the vehicle with the indicating mechanism mounted thereon.

Figure 3 is a horizontal sectional view through the indicator proper of the mechanism.

Figure 4 is a section on the line 4—4 of Fig. 3; and

Figure 5 is a detail side elevation of a portion of one of the levers of the mechanism.

Referring to the drawings in detail, R, R, designate a pair of railway rails, and V designates, generally, a wheeled vehicle such, for example, as a handcar, railway motorcycle or the like to travel the track comprised by said rails and suitable to have the present track gauge indicating mechanism operatively mounted thereon.

The present mechanism includes essentially an indicator proper, designated generally as 10, a pair of levers designated as 11, 11, and a suitable flexible connection, such as a light cable or the like, between the movable element of the indicator 10 and said levers.

The levers 11, 11, which may be of any suitable form, are disposed substantially vertically and are pivotally mounted intermediate their ends, as at 12, 12, upon the frame or other suitable part of the vehicle V for swinging movements in vertical or substantially vertical planes transversely with respect to the said vehicle. One of said levers 11 is disposed adjacent to one side of the vehicle V and the other is disposed adjacent to the other side of said vehicle, and each lever, below its pivot 12, is directed outwardly and provided at its lower end with a tip 13 of suitable wear or abrasion resisting material for sliding contact with the inner or gauge face of the head of the related rail R.

The indicator proper 10 includes a casing 14 of any suitable construction mounted in any suitable manner on the body or other suitable portion of the vehicle V, preferably but not necessarily in the general plane of and in alinement with the upper ends of the levers 11, 11 and disposed preferably horizontally.

A segmental plate 15 is pivotally mounted within said casing in any suitable manner, as at 16, for swinging movement in the plane thereof, which is preferably horizontal, and is provided with suitable calibrations 17 for cooperation with an index 18 on the cover 19 of the casing adjacent to an opening 20 in said cover through which said calibrations are visible.

A pair of sheaves 21 and 22 are suitably mounted within the casing 14 adjacent to each other and to one side of the segmental plate 15 and preferably but not necessarily in alinement, or substantially in alinement, with the upper ends of the levers 11, 11, and a third sheave 23 is suitably mounted within said casing in laterally offset relationship to the sheaves 21, 22 and to the same side of the plate 15 as said sheaves 21, 22, preferably for adjustment toward and away from said plate 15. A fourth sheave 24 either is mounted directly on the plate 15 or otherwise is suitably mounted to swing with said plate, and a suitable spring 25 is provided to tend constantly to swing said plate in a direction away from the sheaves 21, 22 and 23.

A small wire cable or other suitable flexible element 26 is engaged intermediate its ends with the sheave 24 and has one of its end portions extending from said sheave 24 first over the sheave 23, then over the sheave 21 and from the latter sheave through an opening in the adjacent end of the casing 14 to the upper end of the adjacent lever 11 to which it is connected. The other end portion of said flexible element extends from the sheave 24 over the sheave 22 and from the latter sheave through an opening in the other end of the casing 14 to the upper end of the other lever 11 to which it is connected. Thus, the spring 25 maintains the flexible element 26 in tension and tends constantly to swing the upper ends of the levers 11, 11 inwardly, with the result their tipped lower ends normally are urged outwardly against the inner or gauge faces of the rails R, R.

By adjustment of the sheave 23 toward or away from the segmental plate 15, said plate may be caused to assume a normal position relative to the index 18 corresponding to true gauge of the rails R, R. If, thereafter, during movement of the vehicle V along a track, the gauge of the rails should exceed normal at any given point, the lower ends of the levers 11, 11 will swing outwardly under the influence of the spring 25 acting through the segmental plate 15 and, by the swinging movement of said plate, the excessive gauge of the rails will be indicated by the cooperation of the calibrations 17 with the index 19. If, on the other hand, the gauge of the rails should be less than normal at any given point, the lower ends of the levers 11, 11 will be swung inwardly or toward each other with consequent outward swinging of their upper ends and the segmental plate 15 will be swung counter to the direction in which it is urged by the spring 25, thereby indicating through the cooperation of its calibrations 17 with the index 19 the sub-normal gauge of the rails.

According to the present practical embodiment of the invention the segmental plate 15 is mounted on a block 27 which is rotatably mounted within the casing 14 and which has extending therefrom an arm 28 on which the sheave 24 is mounted; the spring 25 is in the form of a coil spring connected at one end to the arm 28 and at its other end to the casing 14, and the sheave 23 is mounted on a slide piece 29 which is guided by ways 30 fastened to the casing 14 and is adjustable by means of a screw 31 swiveled therein and threaded either into the casing 14 or into a suitable part fixed with respect thereto. It will be understood, however, that these features of construction may be modified in various different manners. It will also be understood that in lieu of the index 19, a movable strip may be provided for cooperation with the plate 15 so that as the vehicle V travels along a track a graph will be produced indicative of the gauge condition of the track.

Preferably the lower end portions of the levers 11, 11 are comprised in part by breakable sections 32 of wood or other suitable material so that in the event of the tip of either lever striking an obstruction, the section 32 thereof will break and thus avoid harm to the remainder of the mechanism. The sections 32 may be fastened by bolts or screws to the levers 11 so that they may readily and easily be replaced.

As previously indicated, unless the lower end portions of the levers 11, 11 are held against outward movement during passage of the tips 13 through frogs, switches and the like, there may be danger of said tips striking obstructions with consequent breakage of the levers sections 32. Accordingly, manually operable means preferably is provided whereby the lower ends of the levers 11, 11 may be restrained against outward movement whenever desired. This means comprises a lever 33 or an equivalent manually operable element pivotally or otherwise suitably mounted on the vehicle V for movement to tension a pair of cables or other suitable flexible elements 34 extending from said lever 33 or the like over a suitable sheave or sheaves 35 and connected, respectively, to the levers 11, 11 below their pivots 12. Normally the flexible elements 34 are slack so as not to interfere with the normal operation of the mechanism, but by operating the lever 33 or its equivalent said flexible elements may be tensioned to hold the lower ends of the levers 11, 11 against outward movement.

Obviously, all that is required to mount the mechanism on a vehicle V is to provide suitable pivot pins on the vehicle for the levers 11, 11; to mount the indicator proper and the manually operable element 33 on the vehicle, and to provide a suitable sheave or sheaves for the flexible elements 34. Should it not be practicable to mount the indicator proper in alinement with the upper ends of the levers 11, 11, suitable sheaves obviously may be provided to guide the flexible element 26 from the upper ends of said levers 11, 11 into the casing 14.

The tips 13 preferably are relatively narrow so as to pass readily through frogs, switches and the like, and they are disposed preferably for contact with the sides of the rail heads below the tops thereof so as not to be influenced by any spalling of the metal of the heads adjacent to the tops thereof.

From the foregoing description it is believed that the general objects of the invention will now be fully understood and appreciated as well as the fact that the novel sheaving arrangement described operates to eliminate any effect of the swaying or movement of the vehicle with respect to the rails on the indicating unit, so that only actual changes in gauge will appear on the indicator. Furthermore, another important feature of the invention is with respect to the shatterable portion of the lever, which is a valuable safety factor because it obviates the danger of the tip striking an obstruction and derailing the vehicle.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In combination with a vehicle to travel track rails, a pair of rail gauge face contacting members mounted on said vehicle for inward and outward movement, a movable indicating element, spring means for moving said indicating element in one direction, a sheave swingable with said element, a flexible element connected at its ends with said rail contacting members and engaged over said sheave, other sheaves having fixed operative positions and with which said flexible element is engaged whereby said rail contacting elements are urged constantly outwardly into contact with the rails by said spring means, index means with which said indicating element cooperates to indicate variations in the gauge of the rails, and means for laterally adjusting one of said sheaves relative to another of said sheaves thereby to adjust said flexible element and said indicating element to obtain an initial setting of said indicating element relative to said index means corresponding to true gauge of the rails.

2. In combination with a vehicle to travel track rails, a pair of levers pivoted intermediate their ends to said vehicle, corresponding end portions of said levers being formed and disposed for contact with the gauge faces of the rails, respectively, an indicating element in the form of a calibrated segmental plate pivotally mounted on the vehicle, spring means for swinging said plate in one direction, a sheave swingable with said plate, a flexible element attached at its ends to the other ends of said levers and engaged intermediate its ends over said sheave, other sheaves having fixed operative positions relative to the vehicle and over which said flexible element is engaged whereby said spring means tends constantly to swing said levers to urge their first mentioned end portions outwardly into contact with the rails and whereby said plate is swung counter to the direction in which it is urged by said spring means responsive to relative inward swinging movement of the first mentioned end portions of said levers by the rails, index means with which the calibrations of said plate cooperate, and means for laterally adjusting one of said sheaves relative to another of said sheaves thereby to adjust said flexible element and said indicating element to effect an initial adjustment of said plate relative to said index means corresponding to true gauge of the rails.

3. The combination as set forth in claim 2 in which the first mentioned end portions of the levers include sections readily breakable upon encountering an obstruction during movement of the vehicle along a track.

4. In combination with a vehicle to travel track rails, a pair of rail gauge face contacting members mounted on said vehicle for inward and outward movement, a casing mounted on the vehicle, a movable indicating element mounted in said casing, spring means tending constantly to move said indicating element in one direction, a sheave mounted to move with said indicating element, a flexible element connected at its ends with said rail gauge face contacting members and engaged over said sheaves, other sheaves having fixed operative positions and with which said flexible element is engaged whereby said rail gauge face contacting members are urged constantly outwardly into contact with the rails by said spring means, index means with which said indicating element cooperates to indicate variations in the gauge of the rails, means mounting one of said last mentioned sheaves within said casing for lateral adjustment to vary its operative position relative to another of said sheaves, thereby to adjust said flexible element and said indicating element to obtain an initial setting of said indicating element relative to said index means corresponding to true gauge of the rails, and screw means for adjusting said adjustable sheave.

EDWARD WILLIAM BACKES.